Aug. 14, 1923.
J. R. CRAWFORD
1,465,035
VALVE ACTUATING DEVICE
Filed Sept. 18, 1922
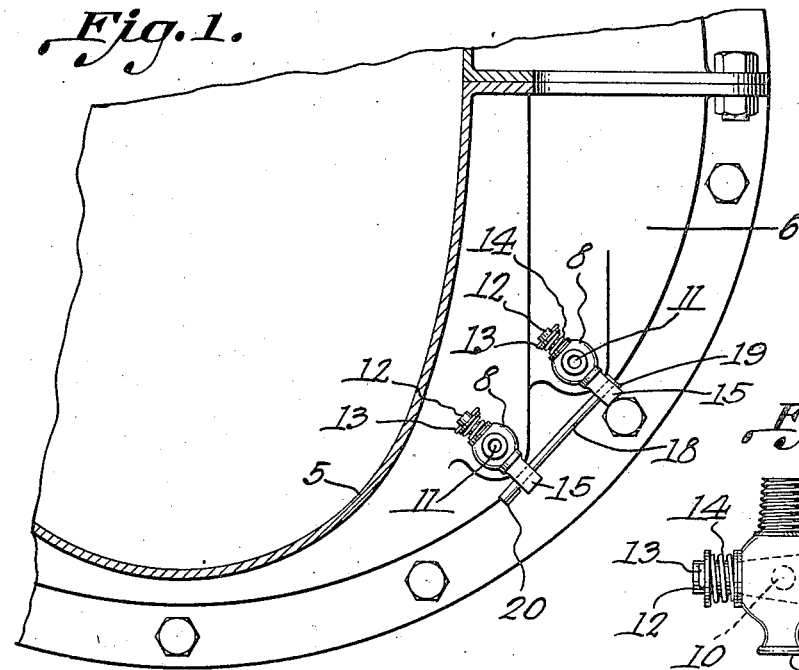
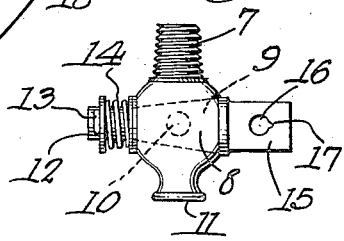
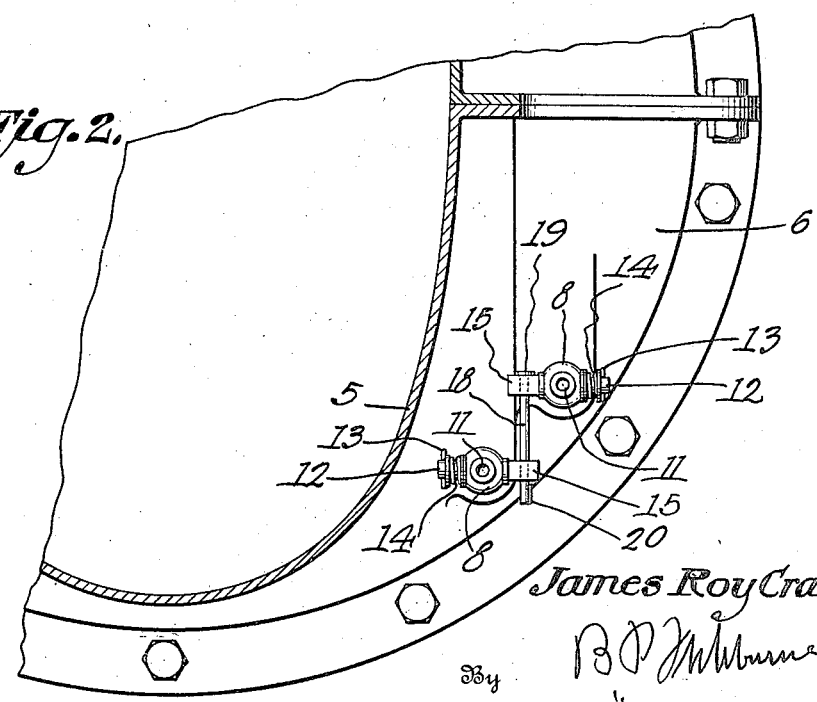
Inventor
James Roy Crawford
By
Attorney Patented Aug. 14, 1923.

1,465,035

UNITED STATES PATENT OFFICE.

JAMES ROY CRAWFORD, OF CLINTON, SOUTH CAROLINA.

VALVE-ACTUATING DEVICE.

Application filed September 18, 1922. Serial No. 588,939.

*To all whom it may concern:*

Be it known that JAMES ROY CRAWFORD, a citizen of the United States, residing at Clinton, in the county of Laurens and State of South Carolina, has invented certain new and useful Improvements in Valve-Actuating Devices, of which the following is a specification.

My invention relates to valve actuating devices, and has particular reference to means adapted to actuate the valves or pet cocks, on the crank case of a Ford automobile, or the Fordson tractor.

As is well known, the Fordson tractor has the rear end of its crank case equipped with two valves or pet cocks, which are vertically spaced, and are employed in ascertaining the level of the oil in the crank case. It frequently occurs, that the handle of the pet cock, is struck by an obstruction, or becomes entangled in weeds or the like, and is accidentally opened. As a result of this, the pet cock will drain the oil from the crank case of the tractor, and the machine may be seriously injured, if not ruined.

In accordance with my invention, the knobs or handles formed upon the stems of the pet cocks, are cut away, so that the stems are free from lateral projections, which would become readily entangled in weeds or the like. The stems are provided with openings, and a rod is passed through the opening in either stem, and is employed to actuate the same. This rod may also be passed through the openings in both stems, and will then serve to lock both stems against turning movement.

In the accompanying drawing forming a part of this specification, and in which like numerals are employed to designate like parts throughout the same, Figure 1 is an elevation of the rear end of the crank case of the Fordson tractor, viewed from the front end of the machine, showing the valves turned so that the openings in either stems are in substantial alinement, Figure 2 is a similar view, showing the valves adjusted so that their stems are substantially horizontal and the openings therein in substantial alinement, and, Figure 3 is a side elevation of the valve, removed.

In the drawings, wherein for the purpose of illustration are shown preferred embodiments of my invention, the numeral 5 designates the crank case of a Fordson tractor, provided at its end with a flange 6, bolted to the gear casing. As is well known, the flange 6 is provided with a pair of screw threaded vertically spaced openings, leading into the crank case at different levels, and these openings receive the screw threaded nipples 7, of the valve casings 8. These valve casings are embodied in valves of the usual construction, found upon the Fordson tractor. Each valve includes a valve body 9, pivoted in the casing 8 and having a transverse port 10 adapted to be brought into registration with the nipple 7 and the outlet 11. The valve body carries an extension 12, at its inner end, apertured to receive a transverse pin 13, engaging a spring 14, serving to keep the valve body seated. The valve body is provided at its forward end with a stem 15, which is preferably substantially square in cross section. In the ordinary type of drain valve employed upon the Fordson tractor crank case, the stem has laterally extending ears, forming a grip or knob for turning the valve body. This construction has been found to be disadvantageous, inasmuch as the extensions catch in weeds or the like, or strike against obstructions, and the accidental opening of the valve is sometimes effected. The stems 15 are therefore made free from these lateral extensions.

Each valve stem 15 is provided with a transverse opening 16, which is preferably cylindrical, and has a radial groove 17 formed therein.

The numeral 18 designates an actuating element, in the form of a rod, which is preferably cylindrical. This rod is provided at one end with a head 19, and at or near its opposite end with a radial rib 20, adapted to be passed through the groove 17, when brought in alinement therewith.

In Figure 1, the valves have their casings 8 turned, so that the valve stems 15 are substantially parallel, and the openings 16 are substantially in alinement. The actuating element 18 is passed into the openings 16, and when held therein, also serves as means to lock the valve stems against turning movement.

The rib 20 ordinarily prevents the upward displacement of the rod 18, as the rib must be brought into registration with the groove 17 before the rod 18 can be withdrawn from the openings 16.

In Figure 2, I have shown the valves adjusted to a position with their valve stems 15 arranged horizontally in overlapping relation. The openings 16 are in substantial alinement, and receive the rod 18.

While I have shown my invention as applied to the crank case of a Fordson tractor, it is obviously applicable to the crank case of a Ford automobile, Ford truck, or other automobiles, trucks, or tractors, embodying a plurality of valves for determining the level of the oil in the crank case.

It is to be understood that the form of my invention herewith shown and described is to be taken as a preferred example of the same, and that various changes in the shape, size, and arrangements of parts may be resorted to without departing from the spirit of my invention, or the scope of the subjoined claims.

Having thus described my invention, I claim:

1. In a valve actuating device, the combination with a plurality of valves connected with the crank case of an engine at different levels for determining the amount of oil therein, said valves having stems provided with transverse openings, of a rod adapted for insertion within the opening of each stem for actuating the valve, said rod being also adapted for insertion through the openings in the stems of all of said valves and held therein to prevent accidental turning movement of said stems.

2. A valve actuating device, comprising, in combination, a plurality of valves connected with the crank case of an engine at different levels for determining the amount of oil therein, said valves having stems provided with transverse openings which are substantially in alinement, a rod provided at one end with a head and adapted for insertion within the opening of each stem and serving to turn the stem, said rod being adapted for insertion within the openings in all of said stems and held therein to prevent accidental turning movement of said stems, and means to prevent the accidental displacement of the rod from within said openings.

3. In a valve actuating device, the combination with a plurality of valves connected with the crank case of an engine at different levels for determining the amount of oil therein, each valve having a valve stem provided with a transverse opening having a groove leading into said transverse opening, and a rod for insertion within the opening in each stem and adapted to turn the stem, said rod being adapted for insertion within the openings in all of said stems and to be held therein and thereby hold said stems against turning movement, a head formed upon the upper end of the rod, and a radial rib formed upon the lower end of the rod and adapted to pass through the groove in each stem, said rib normally preventing accidental vertical displacement of the rod.

In testimony whereof I affix my signature.

JAMES ROY CRAWFORD.